United States Patent [19]

Rakes et al.

[11] 4,214,030
[45] Jul. 22, 1980

[54] THERMOFORMABLE-CROSSLINKABLE ETHYLENE POLYMER SHEET PER SE AND IN LAMINATE FORM AND THERMOFORMED SHEET PRODUCED THEREFROM

[75] Inventors: James L. Rakes; Joseph R. Harder, both of Bartlesville, Okla.

[73] Assignee: Phillips Petroleum Company, Bartlesville, Okla.

[21] Appl. No.: 913,148

[22] Filed: Jun. 6, 1978

[51] Int. Cl.$^2$ .................. B32B 27/08; B32B 27/32; B32B 31/26
[52] U.S. Cl. .................. 428/212; 156/221; 156/244.24; 156/244.11; 156/246; 264/176 R; 264/231; 264/210.1; 428/412; 428/476; 428/483; 428/509; 428/510; 428/516; 428/519; 428/521
[58] Field of Search ............. 428/212, 412, 474, 483, 428/509, 510, 516, 519, 521, 476.1, 476.9; 156/221, 224.24, 244.11, 246; 264/210 R, 231, 176 R

[56] References Cited

U.S. PATENT DOCUMENTS

| 3,876,613 | 4/1975 | Needham et al. | 260/45.85 S |
| 3,989,787 | 11/1976 | Scott et al. | 264/114 |

Primary Examiner—J. C. Cannon

[57] ABSTRACT

A sheet of a crosslinkable polymer of ethylene having a melt index of at least 1.5 is supported by a sheet of a polymer having a melt index of 0.9 or less. The support sheet provides support for the sheet of the crosslinkable polymer of ethylene during a thermoforming operation.

33 Claims, No Drawings

THERMOFORMABLE-CROSSLINKABLE ETHYLENE POLYMER SHEET PER SE AND IN LAMINATE FORM AND THERMOFORMED SHEET PRODUCED THEREFROM

This invention relates to thermoforming. In a specific aspect this invention relates to thermoforming of a crosslinked polymer. In a second specific aspect this invention relates to the forming of a sheet, suitable for thermoforming, from a crosslinkable polymer of ethylene having a high melt index.

Thermoforming is accomplished by clamping or otherwise supporting the outside edges of a thermoplastic sheet and then heating the thermoplastic sheet to its softening temperature at a heating station. The hot and flexible material is then forced against the contours of a mold by mechanical, air, or vacuum pressure. When held to the shape of the mold and allowed to cool, the thermoplastic retains the shape and detail of the mold.

It is highly desirable to produce, by thermoforming, articles which are suitable for severe service requirements. For example, it is desirable to produce articles having high impact strength. Preferably such articles also have high resistance to stress cracking. It is well known that a crosslinked polymer of ethylene will provide these advantages. Thus, it is a first object of this invention to provide a method for forming a thermoformed article of a crosslinked polymer of ethylene.

Sheets of thermoplastic materials are generally produced by extrusion processes. The process of sheet extrusion consists of forcing a hot melt of thermoplastic material through a slit die and cooling the thermoplastic material as the sheet emerges from the die.

It is well known that once a polymer of ethylene has been significantly crosslinked it cannot be extruded. If a crosslinking agent is present in a polymer of ethylene being extruded into a sheet then great care must be taken to control the extrusion rate and the temperature of the extrusion process to prevent crosslinking from taking place.

If a polymer of ethylene with a very low melt index is used in an extrusion process with a crosslinking agent present, then the extrusion temperature must be above the temperature where crosslinking takes place and the extruder will become jammed, making extrusion impossible. This problem can be alleviated by using a polymer of ethylene with a melt index sufficiently high to allow extrusion at a temperature below the temperature at which crosslinking occurs. A sheet of a polymer of ethylene having a crosslinking agent present can thus be formed. However, if the sheet is subsequently raised to the temperature level required for crosslinking while it is in the thermoforming heating station, the sheet will be deformed before crosslinking takes place because the high melt index of the polymer of ethylene being used will cause the polymer sheet to at least partially melt or collapse before crosslinking is completed. It thus is a second object of this invention to provide a method for forming a sheet, suitable for thermoforming, from a crosslinkable polymer of ethylene having a high melt index.

Other objects and advantages of the invention will be apparent from the detailed description of the invention and the appended claims.

As used in this application the following properties are measured according to the test described by the American Society of Testing Materials under the designation listed below and are in the units indicated:

Melt Index (M.I.): ASTM D-123865T, grams/10 min., Condition E.
High Load Melt Index (HLMI): ASTM D-1238-65T, Condition F, grams/10 min.
Density: ASTM D-1505-63T, grams/cc.
Melt Flow (M.F.): ASTM D-1238-65T, Condition L, grams/10 min.

In accordance with the present invention, a method is provided whereby a sheet is formed from a crosslinkable polymer of ethylene having a high melt index. The crosslinkable polymer of ethylene having a high melt index is extruded as a sheet onto a sheet of a polymer having a low melt index. The sheet of a polymer having a low melt index forms a support for the sheet of crosslinkable polymer of ethylene having a high melt index. The crosslinkable polymer of ethylene and the polymer support are then heated to a temperature sufficient to allow crosslinking to occur. While in this heated state the now crosslinked polymer of ethylene and the polymer support are thermoformed to a desired shape. This method allows thermoformed products to have the advantages of high impact strength and high resistance to stress cracking which is possible with crosslinked polymers of ethylene.

The crosslinkable polymer utilized in the present invention is a polymer of ethylene, that is, an ethylene homopolymer, a copolymer of ethylene and at least one acyclic straight or branched chain mono-1-olefin hydrocarbon having 3 to 8 carbon atoms per molecule, or a mixture of such homopolymers, of such copolymers, or of at least one such homopolymer and at least one such copolymer; having incorporated therein a suitable crosslinking compound. A presently preferred group of such hydrocarbon comonomers are the straight chain hydrocarbons, particularly those straight chain hydrocarbons having 3 to 6 carbon atoms per molecule. The copolymers are usually formed with ethylene constituting at least 75 weight percent of the total monomers. Excellent results are obtained with copolymers of ethylene and 1-butene, wherein ethylene constitutes at least 75 weight percent of the total monomers. Other polymers of ethylene include, for example, copolymers of ethylene and propylene, copolymers of ethylene and isobutene, copolymers of ethylene and 1-pentene, copolymers of ethylene and 3-methyl-1-butene, copolymers of ethylene and 1-hexene, copolymers of ethylene and 4-methyl-1-pentene, copolymers of ethylene and 1-heptene, copolymers of ethylene and 1-octene, and copolymers of ethylene and 4-ethyl-1-hexene.

The crosslinkable polymer of ethylene may have any suitable melt index and density which will allow the crosslinkable polymer of ethylene to be extruded without crosslinking occurring. In general, the crosslinkable polymer of ethylene will have a melt index of at least 1.5 and a density in the range of about 0.92 to about 0.975, preferably in the range of about 0.94 to about 0.97. Crosslinkable polymers of ethylene with a melt index in the range of about 1.5 to about 200 may be used, with polymers of ethylene having a melt index in the range of about 10 to about 50 being presently preferred. The polymers of ethylene can be produced by any suitable method and can be selected from among those commercially available where desired.

A preferred polymer of ethylene in this invention is a homopolymer of ethylene having a melt index of about 30 and a density of about 0.967.

Any suitable crosslinking compound which will produce crosslinking of the polymer of ethylene may be utilized as a crosslinking agent. Suitable crosslinking compounds include the acetylenic diperoxy compounds, which includes the hexynes having the formula

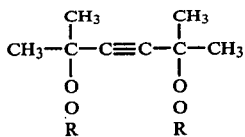

octynes having the formula

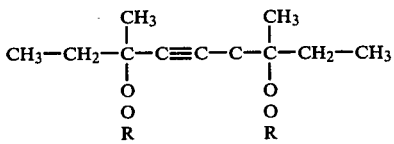

and octadiynes having the formula

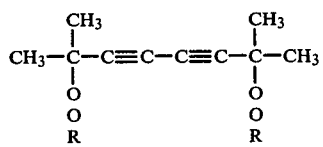

wherein each R is individually selected from the group consisting of tertiary alkyl, alkoxycarbonyl, and benzoyl. In general, the molecular weights of the polyperoxides fall within the range of about 230 to about 550. Excellent results are received with the above-noted hexynes. Among the compounds encompassed within the above-noted hexynes, octynes, and octadiynes are:
2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-Dimethyl-2,5-di(alpha-cumyl peroxy)hexyne-3
2,5-Dimethyl-2,5-di(peroxy beta-chloroethyl carbonate)hexyne-3
2,5-Dimethyl-2,5-di(t-butylperoxy)hexyne-3, and mixtures of any two or more thereof.

Any suitable amount of crosslinking agent, sufficient to effect significant crosslinking, can be incorporated into the polymer of ethylene. The amount employed will depend upon the specific crosslinking agent as well as the degree of crosslinking desired. In general the amount of the crosslinking agent will be in the range of about 0.1 to about 10, preferably in the range of about 0.5 to about 3, parts by weight per 100 parts by weight of the polymer of ethylene.

The polymer utilized to form the support layer can be any suitable polymer known in the art having a melt index sufficiently low to prevent the support polymer from being deformed when the support polymer is heated to a temperature suitable for crosslinking the crosslinkable polymer of ethylene. In general, the polymer utilized to form the support layer will have a melt index in the range of from about a high load melt index of 0.01 to a melt index of 0.9, with a melt index in the range of from about a high load melt index of 0.3 to a melt index of 0.7 being preferred. Examples of suitable polymers are polyamides, including nylon 6-6, nylon 6, nylon 11; polycarbonates; homopolymers of mono-1-olefins having 2 to 8 carbon atoms per molecule, including polyethylene, polypropylene; copolymers of at least two mono-1-olefin having 2 to 8 carbon atoms per molecule, including copolymers of ethylene and propylene, copolymers of ethylene and isobutene; polyesters, including polyethylene terephthalate; polystyrene; cellulosic polymers, including ethyl cellulose; and mixtures of any two or more thereof.

The extrusion temperature and rate for the support polymer may be any suitable extrusion rate and temperature for the particular polymer being used as a support. The extrusion rate and temperature is determined primarily by the melt index of the polymer being extruded. The thickness of the support polymer sheet may be any thickness capable of maintaining its shape and supporting the crosslinkable polymer in the heating section of the thermoforming operation.

The extrusion temperature and rate for the crosslinkable polymer of ethylene must be closely controlled. The extrusion temperature must be sufficient for the extrusion process to operate but must not exceed the temperature at which any significant crosslinking will occur for the particular extrusion rate being used. For a typical extrusion process for a polymer of ethylene employing one of the acetylenic diperoxy compounds, crosslinking will generally begin to occur at around 320° F. (160° C.). In general the lowest temperature at which extrusion of the polymer of ethylene is still feasible is around 290° F. (143° C.). Thus the extrusion temperature will usually be maintained between about 290° F. (143° C.) and 320° F. (160° C.), preferably in the range of about 295° F. (146° C.) to about 310° F. (154° C.), with a temperature of about 300° F. (149° C.) being generally desirable.

The crosslinkable polymer of ethylene is preferably extruded as a sheet onto the sheet of support polymer. If the support polymer is also a polymer of ethylene or some other polymer compatible with the polymer of ethylene, then the support polymer and the crosslinkable polymer of ethylene will be laminated by the heat of the crosslinkable polymer of ethylene as it is extruded. It is, however, within the scope of the invention to not laminate the crosslinkable polymer of ethylene and the support polymer. This may cause air bubbles to occur but may be desirable where it is desirable to peel off or otherwise remove the support layer after the crosslinkable polymer of ethylene has been thermoformed. In the present invention the support polymer and the crosslinkable polymer of ethylene are preferably laminated to provide for ease of handling and removal of any air pockets.

After the sheet of a crosslinkable polymer of ethylene has been formed on the sheet of support polymer, the composite sheet may be cut into any desired shape and then thermoformed to produce the desired product. After cutting, the composite sheet is preferably placed in thermoforming clamps which clamp the outside edges of the composite sheet. However, the composite sheet may be placed in any other type of support mechanism that is compatible with the particular thermoforming process and still be within the scope of the invention. The composite sheet is positioned with the support sheet on the bottom side. After the composite sheet has been placed in the thermoforming clamps, the composite sheet is transferred to the thermoformer heating station which may be any type of heating station compatible with the thermoforming process. The composite sheet is then heated for a length of time and at a temperature which is sufficient to both soften the composite sheet and allow crosslinking of the crosslinkable polymer of ethylene to occur. In general, the sheet must be heated to a temperature of over 320° F. (160° C.) for crosslinking to occur. However, for most polymers the temperature of the sheets should be held under 450° (232° C.) to prevent scorching and burning. The temperature of the composite sheet during the crosslinking is preferably between about 340° F. (171° C.) and 370° F. (188° C.).

It has been found that if the product has been formed properly without scorching or discoloration, then the composite sheet was hot enough to allow thermoforming to occur. The operator can tell by looking at the product whether the proper temperature has been reached. If the product is incomplete then the temperature of the composite sheet is too low and the sheet must be held in the heating station for a longer period of time to achieve the desired temperature. Conversely, if scorching or discoloration of the product is observed, then the temperature of the composite sheet is too high and the composite sheet must be removed from the heating station sooner to achieve the desired temperature. It is within the scope of this invention to use a sophisticated control system to control the composite sheet temperature; however, operator observation of the product to control the composite sheet temperature is presently preferred.

After the composite sheet has been heated to a desired temperature, the composite sheet is thermoformed to the desired shape. The product thus formed will have the advantages of the strength, high impact strength, and high resistance to stress cracking of the crosslinked polymer of ethylene.

To stabilize the thermoformed article to avoid a change of properties upon extended exposure to heat, it is preferred that an antioxidant be incorporated into each polymer composition prior to extrusion. Any suitable stabilizing antioxidant can be used. Stabilizers which have produced excellent results in the practice of the invention include polymerized trimethyl dihydroquinoline and polymerized 1,2-dihydro-2,4-trimethyl quinoline. In general, an amount of stabilizer needed to accomplish the desired stabilization will be used and excess stabilizer generally will be avoided because of excess cost and possible detrimental effect on the product. Amounts in the range of 0.001 to 5 parts by weight per 100 parts by weight of the polymer have been suitable. Often superior stabilization without excessive cost is obtained in the range of 0.01 to 1 part by weight of stabilizer per 100 parts by weight of the polymer.

Other ingredients which do not adversely affect either the thermoforming or the crosslinking and which do not impart undesirable characteristics to the finished article can be added. Examples of such materials which can be added under suitable conditions and in suitable amounts include pigments, additional stabilizers such as metal complexing agents, antistatic agents, ultraviolet absorber for light stabilization, fillers, reinforcing materials, etc. However, one should make certain that any additive selected is compatible with the specific composition to permit good thermoforming and crosslinking to obtain well formed articles having desired properties.

The following example is presented in further illustration of the invention, but should not be construed in undue limitation thereof.

EXAMPLE

The crosslinkable polymer of ethylene used was a homopolymer of ethylene having a melt index of 30 and a density of 0.967 containing 0.75 part per 100 parts of 2,5-dimethyl-2,5-di(t-butylperoxy)hexyne-3 as a crosslinking agent. The support polymer used was a copolymer of ethylene-butene having a melt index of 0.65 and a density of 0.943. The homopolymer of ethylene was extruded at a temperature of 300° F. onto the support polymer. The sheet thickness of the homopolymer of ethylene was 40 mils. The sheet thickness of the copolymer of ethylene-butene was 15 mils. A very good lamination was observed between the homopolymer of ethylene and the copolymer of ethylene-butene.

The laminated sheet was heated to a temperature of about 360° F. (182° C.) and molded in a mold which was held at 180° F. (82° C.). Excellent product formation was observed after cooling. The density of the homopolymer of ethylene after thermoforming was 0.940. The % gel was 57.8 as measured by ASTM-D-2765. Both of these measurements indicate that crosslinking has occurred.

Reasonable variations and modifications are possible within the scope of the disclosure and the appended claims to the invention.

That which is claimed is:

1. A sheet of a crosslinkable polymer of ethylene supported by a sheet of a support polymer where said crosslinkable polymer of ethylene is selected from a group consisting of ethylene homopolymers, copolymers of ethylene and at least one acyclic mono-1-olefin hydrocarbon having 3 to 8 carbon atoms per molecule, and mixtures of any two or more thereof, said crosslinkable polymer of ethylene having incorporated therein a suitable crosslinking agent and where said support polymer has a melt index which is sufficiently low to prevent said support polymer from being deformed when said support polymer is heated to a temperature suitable for crosslinking said crosslinkable polymer of ethylene.

2. A sheet in accordance with claim 1 wherein said crosslinkable polymer of ethylene has a melt index in the range of about 1.5 to about 200 and a density in the range of about 0.92 to about 0.975.

3. A sheet in accordance with claim 1 wherein said support polymer has a melt index in the range of about 0.001 to about 0.9.

4. A sheet in accordance with claim 1 wherein the sheet of said crosslinkable polymer of ethylene is laminated with the sheet of said support polymer.

5. A sheet in accordance with claim 1 wherein said crosslinkable polymer of ethylene is a homopolymer of ethylene having a melt index of about 30 and a density of about 0.967.

6. A sheet in accordance with claim 1 wherein said suitable crosslinking agent is an acetylenic diperoxy compound selected from the group consisting of hexynes having the formula

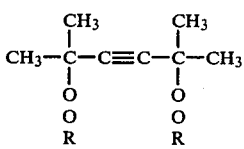

octynes having the formula

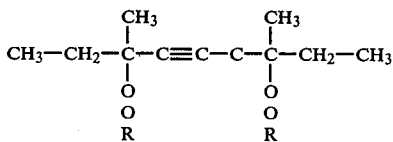

and octadiynes having the formula

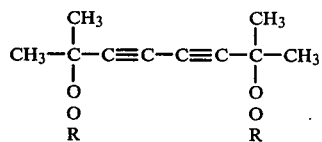

wherein R is selected from the group consisting of tertiary alkyl, alkoxycarbonyl, and benzoyl.

7. A sheet in accordance with claim 1 wherein said support polymer is is selected from a group consisting of polyamides, polycarbonates, homopolymers of mono-1-olefins having 2 to 8 carbon atoms per molecule, copolymers of at least two mono-1-olefin having 2 to 8 carbon atoms per molecule, polyesters, polystyrene, and cellulosic polymers, and mixtures of any two or more thereof.

8. A thermoformed article produced from a composite sheet having at least first and second layers, said first layer comprising a crosslinked polymer of ethylene selected from a group consisting of ethylene homopolymers, copolymers of ethylene and at least one acyclic mono-1-olefin hydrocarbon having 3 to 8 carbon atoms per molecule, and mixtures of any two or more thereof, said second layer comprising a support polymer having a melt index which is sufficiently low to prevent said support polymer from being deformed when said support polymer is heated to the temperature required to crosslink the crosslinkable polymer of ethylene from which said crosslinked polymer of ethylene was formed.

9. A thermoformed article in accordance with claim 8 wherein said cross-linked polymer of ethylene has a melt index in the range of about 1.5 to about 200 and a density in the range of about 0.92 to about 0.975.

10. A thermoformed article in accordance with claim 8 wherein said support polymer has a melt index in the range of about 0.001 to about 0.9.

11. A thermoformed article in accordance with claim 8 wherein said first layer is laminated with said second layer.

12. A thermoformed article in accordance with claim 8 wherein said cross-linked polymer of ethylene is a homopolymer of ethylene having a melt index of about 30 and a density of about 0.967.

13. A thermoformed article in accordance with claim 8 wherein said support polymer is selected from a group consisting of polyamides, polycarbonates, homopolymers of mono-1-olefins having 2 to 8 carbon atoms per molecule, copolymers of at least two mono-1-olefin having 2 to 8 carbon atoms per molecule, polyesters, polystyrene, and cellulosic polymers, and mixtures of any two or more thereof.

14. A method for producing a sheet of a crosslinkable polymer of ethylene where said crosslinkable polymer of ethylene is selected from a group consisting of ethylene homopolymers, copolymers of ethylene and at least one acyclic mono-1-olefin hydrocarbon having 3 to 8 carbon atoms per molecule, and mixtures of any two or more thereof, said crosslinkable polymer of ethylene having incorporated therein a suitable crosslinking agent, comprising the steps of:

extruding a sheet of said crosslinkable polymer of ethylene; and supporting the sheet of said crosslinkable polymer of ethylene on a sheet of a support polymer where said support polymer has a melt index which is sufficiently low to prevent said support polymer from being deformed when said support polymer is heated to a temperature suitable for crosslinking said crosslinkable polymer of ethylene.

15. A method in accordance with claim 14 wherein said crosslinkable polymer of ethylene has a melt index in the range of about 1.5 to about 200 and a density in the range of about 0.92 to about 0.975.

16. A method in accordance with claim 14 wherein said support polymer has a melt index in the range of about 0.001 to about 0.9.

17. A method in accordance with claim 14 wherein said step of supporting the sheet of said crosslinkable polymer of ethylene on a sheet of said support polymer comprises extruding the sheet of said crosslinkable polymer of ethylene onto the sheet of said support polymer in such a manner that a layered composite sheet is formed.

18. A method in accordance with claim 17 wherein the sheet of said crosslinkable polymer of ethylene is laminated with the sheet of said support polymer.

19. A method in accordance with claim 17 wherein the extrusion of said crosslinkable polymer of ethylene is carried out at a temperature in the range of about 290° F. to about 320° F.

20. A method in accordance with claim 17 wherein said crosslinkable polymer of ethylene is a homopolymer of ethylene having a melt index of about 30 and a density of about 0.967.

21. A method in accordance with claim 14 wherein said suitable crosslinking agent is an acetylenic diperoxy compound selected from the group consisting of hexynes having the formula

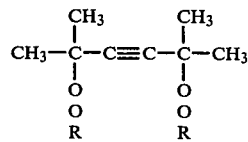

octynes having the formula

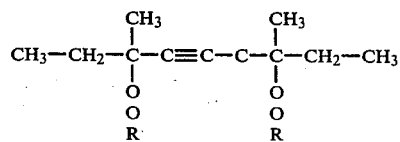

and octadiynes having the formula

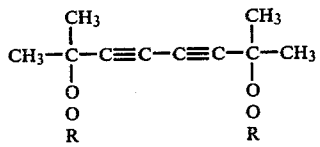

wherein R is selected from the group consisting of tertiary alkyl, alkoxycarbonyl, and benzoyl.

22. A method in accordance with claim 14 wherein said support polymer is selected from a group consisting of polyamides, polycarbonates, homopolymers of mono-1-olefins having 2 to 8 carbon atoms per molecule, copolymers of at least two mono-1-olefins having 2 to 8 carbon atoms per molecule, polyesters, polystyrene, and cellulosic polymers, and mixtures of any two or more thereof.

23. A method of thermoforming a sheet of a crosslinkable polymer of ethylene where said crosslinkable polymer of ethylene is selected from the group consisting of ethylene homopolymers, copolymers of ethylene and at least one acyclic mono-1-olefin hydrocarbon having 3 to 8 carbon atoms per molecule, and mixtures of any two or more thereof, said crosslinkable polymer of ethylene having incorporated therein a suitable crosslinking agent, comprising the steps of:
supporting said sheet of a crosslinkable polymer of ethylene on a sheet of a support polymer, to thereby form a composite sheet where said support polymer has a melt index which is sufficiently low to prevent said support polymer from being deformed when said support polymer is heated to a temperature suitable for crosslinking said crosslinkable polymer of ethylene;
heating said composite sheet to a temperature sufficient to produce significant crosslinking of said crosslinkable polymer of ethylene, said temperature also being suitable to soften the sheet of said crosslinkable polymer of ethylene and the sheet of said support polymer to the extent necessary for the thermoforming process; and
thermoforming said composite sheet to produce a desired product.

24. A method in accordance with claim 23 wherein said crosslinkable polymer of ethylene has a melt index in the range of about 1.5 to about 200 and a density in the range of about 0.92 to about 0.975.

25. A method in accordance with claim 23 wherein said support polymer has a melt index in the range of about 0.001 to about 0.9.

26. A method in accordance with claim 23 wherein said step of supporting the sheet of said crosslinkable polymer of ethylene on the sheet of said support polymer comprises extruding the sheet of said crosslinkable polymer of ethylene onto the sheet of said support polymer in such a manner that a layered composite sheet is formed.

27. A method in accordance with claim 26 wherein the sheet of said crosslinkable polymer of ethylene is laminated with the sheet of said support polymer.

28. A method in accordance with claim 26 wherein the extrusion of said crosslinkable polymer of ethylene is carried out at a temperature in the range of about 290° F. to about 320° F.

29. A method in accordance with claim 26 wherein said crosslinkable polymer of ethylene is a homopolymer of ethylene having a melt index of about 30 and a density of about 0.967.

30. A method in accordance with claim 23 wherein the temperature to which the composite sheet is heated is within the range of about 320° F. to about 450° F.

31. A method in accordance with claim 30 wherein said crosslinkable polymer of ethylene is a homopolymer of ethylene having a melt index of about 30 and a density of about 0.967.

32. A method in accordance with claim 23 wherein said suitable crosslinking agent is an acetylenic diperoxy compound selected from the group consisting of hexynes having the formula

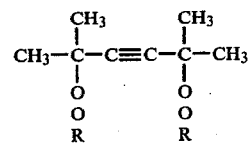

octynes having the formula

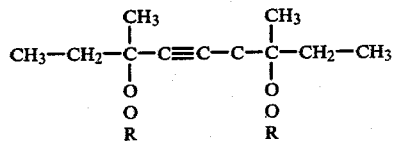

and octadiynes having the formula

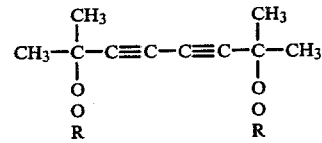

wherein R is selected from the group consisting of tertiary alkyl, alkoxycarbonyl, and benzoyl.

33. A method in accordance with claim 23 wherein said support polymer is selected from a group consisting of polyamides, polycarbonates, homopolymers of mono-1-olefins having 2 to 8 carbon atoms per molecule, copolymers of at least two mono-1-olefins having 2 to 8 carbon atoms per molecule, polyesters, polystyrene, and cellulosic polymers, and mixtures of any two or more thereof.

* * * * *